United States Patent Office 2,763,076
Patented Sept. 18, 1956

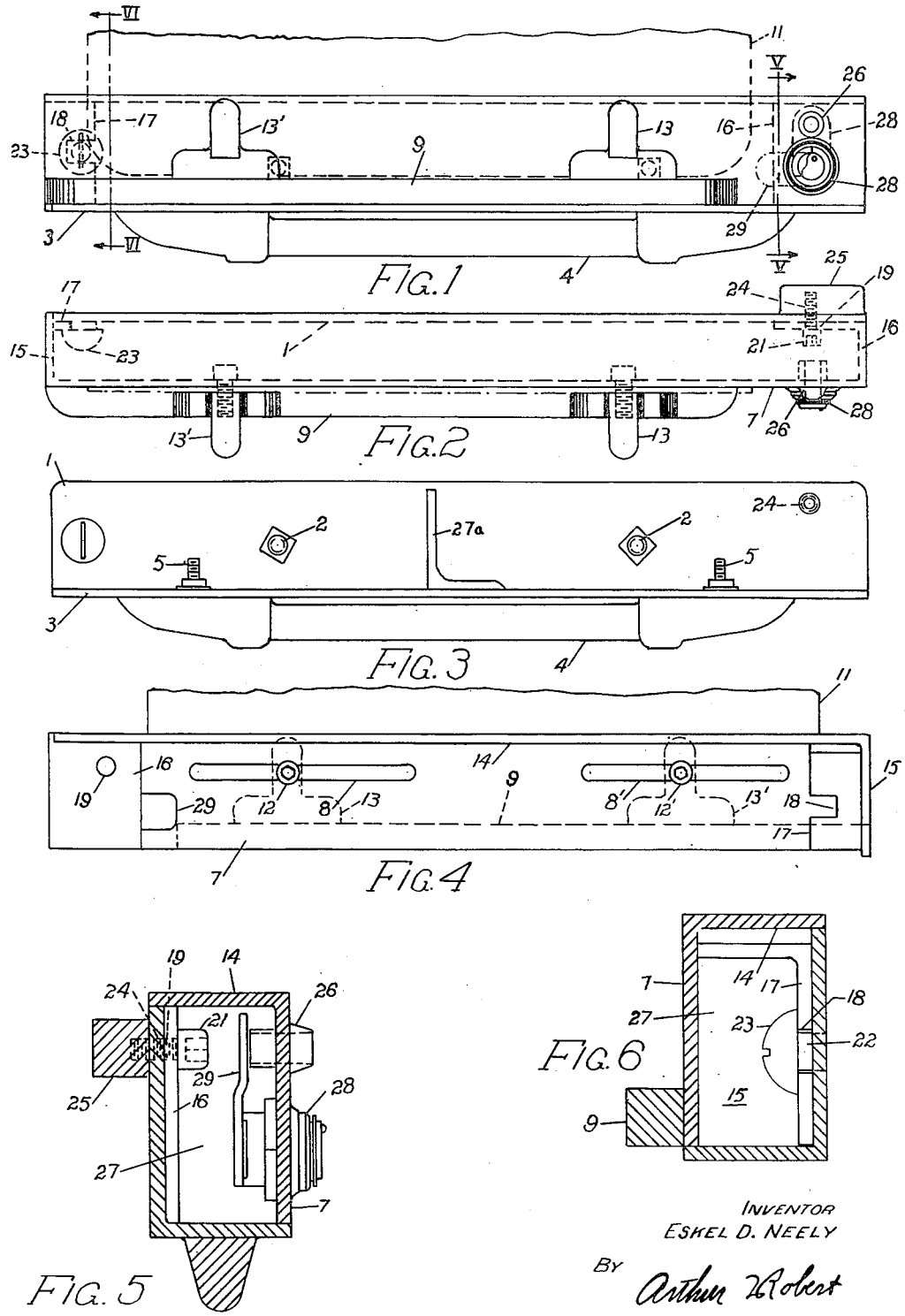

2,763,076
AUTOMOBILE LICENSE HOLDER
Eskel D. Neely, New Albany, Ind.
Application January 7, 1953, Serial No. 330,073
3 Claims. (Cl. 40—125)

The present invention relates to a license plate holder for automobiles, which is designed to prevent easy removal of the license plate.

In the case of the theft of an automobile if the thief can replace the license plate the possibility of getting away is increased. In the present invention the license plate is secured in such a manner that it cannot be removed quickly, and for this reason, theft of the automobile is discouraged.

The invention will be described in greater detail in connection with the accompanying drawing illustrating a preferred embodiment of the invention by way of example, and wherein:

Figure 1 is a rear elevation of the invention;
Figure 2 is a plan view;
Figure 3 is an elevation view with the cover bar removed;
Figure 4 is a rear view of the cover bar;
Figure 5 is a section taken on line V—V of Figure 1; and
Figure 6 is a section taken on line VI—VI of Figure 1.

Referring to the drawing, Figure 3, a base frame or plate 1 is fastened to the deck of the trunk compartment of an automobile, as by bolts 2, said plate having a bottom flange 3. A handle member 4 extends from the flange 3 to enable the deck to be lifted for opening the trunk compartment. This handle member is secured to the flange 3 by bolts 5.

The base frame or plate 1 is adapted to receive a outer frame or cover plate 7 having slots 8 and 8' therein, and a bar 9 is secured to the front of the cover plate. The license plate 11 is clamped in place to cover plate 7 by bolts 12, 12' extending through the slots, and having T shaped nuts 13, 13' on the ends thereof. It will be observed that the inner clamping member or heads of bolts 12, 12' are on the interior face or inner side of the outer frame or cover plate while the outer clamping members or T nuts are on the outer side of the outer frame 7 where they abut the bar 9 so they cannot be rotated. The license plate also engages or rests on the bar 9 at the bottom.

The outer frame or cover plate 7 has a top flange 14, an end flange 15 and a C-shaped end flange 16. Flange 15 has attached thereto a plate 17 with a recess 18, and flange 16 has an aperture 19 therein.

A rivet 22 in base frame or plate 1 has a head 23, and in assembled position the recess or slot 18 is received between the head 23 and plate 1, with the aperture 19 registering with a bore 24 in plate 1. The plate is backed by a boss 25 into which the threaded bore 24 extends, and a screw 21 clamps the flange 16 to plate 1. The cover plate 7 has a ferrule 26 in alignment with aperture 24 and a suitable wrench can be inserted through ferrule 26 to tighten or to release bolt or screw 21. It will be seen that in assembled position, the chamber 27 is entirely enclosed between plates 1 and 7; bottom and top flanges 3, 14; and end flanges 15, 16. The bolt heads 12, 12' are within chamber 27, as is the head of bolt 21, and the license plate 11 cannot be removed without access to the bolts 12, 12'. This can only be accomplished by removing bolt 21 through aperture 26.

If desired, an angle bar 27a may be secured to plate 1 at about the middle. The bar extends out sufficiently so that when plates 1 and 7 are assembled, flange 16 is spaced slightly from plate 1, and the bolt 21 therefore slightly bows plate 7 as it is tightened. This eliminates the possibility of rattling. The bar 27a also acts as a reenforcement to prevent the outer plate 7 being forcibly bent in to a position where access may be had to nuts 2 with a curved wrench.

Aperture 26 is barred by a lock 28 controlling position of arm 29 by means of a key. When arm 29 is in the vertical position, as shown in Figure 5, and in dotted lines in Figure 1, it blocks access through ferrule 26 to bolt 21, so that plate 7 cannot be removed to gain access to bolts 12, 12'. By operating the key in lock 28, the arm 29 is turned to the horizontal position, as shown in Figure 4, and in dot and dash lines in Figure 1, and in this position a wrench can be inserted through ferrule 26 to remove bolt 21. When this bolt is removed, plate 7 carrying the license plate can be removed by sliding the plate to the left as seen in Figure 1, so as to disengage slot 18 from the rivet head or undercut member 23. When disassembled, bolts 12, 12' can be removed to change the license plate as required from year to year. The plate 7 is reassembled by sliding the plate to the right to engage slot 18 under head 23, and the bolt 21 then is screwed into hole 24, and the lock is operated to position arm 29 vertically to block the hole in ferrule 26.

Thus it will be seen that the replacement of the license plate, when required, is easily accomplished, while unauthorized removal of the license plate is difficult.

I claim as my invention:

1. A license plate holder comprising: an outer frame having an outer frame wall presenting inner and outer sides; means for clamping a license plate against the outer side of said outer frame wall, said clamping means including an outer non-rotatable plate-clamping member on the outer side of said outer frame wall, an inner rotatable plate-clamping member on the inner side of said outer frame wall and a threaded shank passing through said outer frame wall and interconnecting said plate-clamping members so that said outer non-rotatable member clamps said license plate against it and releases it from the outer side of said outer frame wall as said inner rotatable member is rotated in one direction and the other; a base frame adapted to be rigidly secured to a vehicle; said outer frame being adapted to be positioned in assembled relationship upon the base fram wherein both frames mutually cooperate to form a chamber enclosing said inner rotatable plate-clamping member and preventing access thereto so long as said frames remain in assembled relationship; means for holding said frames in assembled relationship including a stem secured to one of said frames to project from the inner side thereof through a wall of the other frame into a normally closed chamber on one side of said other frame and a securing element located within said normally closed chamber and removably secured to the projecting end of said stem to hold said frames in their assembled relationship; and key operated means controlling access to said assembly securing element.

2. The license plate holder of claim 1 wherein the means for holding said frames together comprises interlocking cooperating means on said frames adapted to be engaged and disengaged by relative sliding movement.

3. The license plate holder of claim 2 wherein said holding means includes means for locking said frames against relative sliding movement.

References Cited in the file of this patent
UNITED STATES PATENTS

| | | |
|---|---|---|
| 1,498,601 | Zipay | June 24, 1924 |
| 1,561,420 | Elliott | Nov. 10, 1925 |
| 1,587,952 | Hartman | June 8, 1926 |
| 1,983,105 | Stewart | Dec. 4, 1934 |
| 2,081,627 | Heinrich | May 25, 1937 |